(12) United States Patent
Parham et al.

(10) Patent No.: US 6,453,326 B1
(45) Date of Patent: Sep. 17, 2002

(54) METHOD AND SYSTEM FOR NETWORK DATA REPLICATION

(75) Inventors: Jeffrey B. Parham, Redmond; Rengarajan S. Raghavan, Bellevue, both of WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/461,831

(22) Filed: Dec. 15, 1999

Related U.S. Application Data

(60) Provisional application No. 60/144,576, filed on Jul. 19, 1999, now abandoned.

(51) Int. Cl.[7] .............................................. G06F 17/30
(52) U.S. Cl. ....................................... 707/204; 707/202
(58) Field of Search ................................ 707/201, 202, 707/204

(56) References Cited

U.S. PATENT DOCUMENTS 5,721,915 A * 2/1998 Sockut et al. ............... 395/616
5,884,322 A * 3/1999 Sidhu et al. ................. 707/200
6,122,630 A * 9/2000 Strickler et al. ............... 707/8

\* cited by examiner

*Primary Examiner*—Safet Metjahic
*Assistant Examiner*—Cam-Linh Nguyen
(74) *Attorney, Agent, or Firm*—Leydig, Voit & Mayer, Ltd.

(57) ABSTRACT

A method and system for replicating database changes among servers of a database system ensures convergence of replication by changing the GUID of a server used to label database changes when the server is restored from backup. By using a new GUID to identify new database changes made after the restoration, the new changes will not be confused with changes made by the server after the backup and before the restoration, which are identified by the old GUID of the server. The replication performance is further optimized by maintaining records on old GUIDs used by the server in the past and the extent of backup associated with each of the old GUIDs, and using such records to avoid redundant replications of database changes under the old server identification to or from the restored server.

18 Claims, 5 Drawing Sheets

METHOD AND SYSTEM FOR NETWORK DATA REPLICATION

CROSS REFERENCE TO RELATED APPLICATION

This application claims the benefit of U.S. Provisional Application Ser. No. 60/144,576 filed Jul. 19, 1999 abandonment.

TECHNICAL FIELD OF THE INVENTION

This invention relates generally to database systems, and more particularly to data replication among multiple servers of a database network.

BACKGROUND OF THE INVENTION

A database system often contains multiple servers connected by a network. In order to keep the data maintained by each server up to date, changes made by one server will be replicated to all other servers of the database system. Replication is the process by which changes present on a "source" server are received and applied by a "destination" server. The changes being replicated may have originated on the source server or on another server.

For instance, in a proposed computer network, there are a plurality of directory service agents (DSAs) each maintaining a local database of directory service information. Each of the DSAs can make changes to the directory information, and the changes are replicated to other DSAs in the network. To keep track of the changes to allow proper. replication, each change (e.g., creating a new user, changing a user's password, etc.) originated by a DSA is identified by a database GUID and an update sequence number (USN). The database GUID identifies the local database of the DSA in which the change was originated. Each database GUID corresponds to exactly one DSA. The USN is a monotonically increasing serial number that is, for example, 64-bit long. It increases by one for each originating or replicated-in change applied to the database.

The database GUID and the USN together form a "signature" represented as (Database-GUID, USN), which uniquely identifies the change—i.e., no two changes should carry the same signature. In this regard, a USN is meaningless without the context of the database GUID for the purpose of uniquely identifying the change. For example, the change (Database-GUID1, 5) has no relevance to the change (Database-GUID2, 5). The change. (Database-GUID1, 10), on the other hand, does have a relationship to the change (Database-GUID1, 5) in that the change at USN 10 was made after the change at USN 5, because the USNs were associated with the same database GUID and USNs increase over time.

Each update in a DSA's database is labeled with the signature of the change generated by the originating write and the USN at which the change was applied locally by the DSA. The latter is known as "usnChanged." For an update that originated on the local DSA, the USN in the signature and the usnChanged are identical, and the database GUID in the signature is the database GUID of the local DSA. For an update that originated on another DSA and was later replicated to the local DSA, the USN in the signature (which is relative to the database GUID of the originating DSA) bears no relationship with the usnChanged (which is relative to the database GUID of the local DSA), and the database GUID in the signature is not the database GUID of the local DSA.

To facilitate replication of changes, each DSA tracks "watermarks" of the signatures issued on all other DSAs for changes that it has applied locally. The watermark is an assertion that every change made on the DSA corresponding to the database GUID at or below the given USN has been applied to the local DSA. This includes changes originated on the DSA with the given GUID as well as changes originated on other DSAs that have been applied to the DSA with the given GUID. For example, if DSA2 has recorded the watermark (Database-GUID1, 10), then it asserts that it has applied all changes made in Database-GUID1 at USNs 1, 2, 3, . . . , 10. The set of watermarks a particular DSA has with respect to all other DSAs is known as its "up-to-dateness vector," or "UTD vector."

In this proposed network database, the receiver of changes initiates the replication. In other words, the destination DSA asks the "source" DSA for any changes the source DSA may have that the destination does not. This form of replication is also known as "pull" replication. To respond to the replication request, the source DSA needs an efficient method to locate these changes that should be replicated to the destination DSA. It does so by checking in the UTD vector presented by the destination DSA in its request for a watermark relative to the source DSA's database GUID. If such a watermark is found, and assuming the watermark is X, the source DSA knows that it only has to look at updates in its database with usnChanged value greater than X. This is because the UTD vector indicates that all changes originated or replicated by the source DSA with USN at or below X have already been applied to the destination DSA, so that updates with usnChanged less or equal to X do not have to be replicated again. If no watermark relative to the source DSA's database GUID can be found, the destination has to look at all updates in its database, i.e., starting at USN 0.

For each update on the source DSA found by comparing its usnChanged with the watermark, the source DSA looks at the. signature of the update and references it against the UTD vector provided by the destination. If a watermark is found with the database GUID of the signature of the change, the change has to be sent to the destination DSA if and only if the USN of the signature is greater than the USN in the watermark. This is again because the watermark indicates that the destination has applied all updates at or prior to its associated USN. If no watermark is found with the database GUID of the signature, the update is sent to the destination DSA.

After the destination has received and applied all changes sent by the source DSA, the destination DSA then asserts it is at least as up-to-date with respect to other DSAs as the source DSA is. The destination DSA then updates each of its watermarks to at least the corresponding USN recorded in the watermarks with corresponding database GUIDs at the source, and adds any watermarks relative to database GUIDs not in its own UTD vector but present in the source DSA's UTD vector.

Although this scheme of controlling data replication based on watermarks can potentially provide efficient data replication across a database system, the reliability of the replication is put in question in the event a server has to be restored from backup. In real-world operations, there is always the risk that the local database of a server will be damaged or somehow made irrecoverable such that the database has to be reconstructed from a backup. A consequence of the restoration is that the restored server has lost the changes it made after the backup and before the restoration. Those "lost" changes, however, may have already been replicated to other servers in the system. When the restored server continues from the restored state and adds new changes, some of the changes may be given signatures that have already been used for changes made before the restoration and replicated to other servers. Thus, two coexisting yet different changes may have the same signature. This can cause great confusion and inconsistency in the data replication, and, as a result, there is no guarantee of the convergence of the data on different servers through replication. Different approaches, such as the "backsyncing" process that will be described in greater detail below, have been proposed to address this problem of replication after restoration, but fail to provide satisfactory results.

SUMMARY OF THE INVENTION

In view of the foregoing, the present invention provides a method and system for replicating database changes among servers of a database system that effectively removes the inconsistency problems encountered after restoration from backup as described above by assigning a new GUID to a server after it has been restored. This new GUID is used for identifying new changes made by the server after restoration. By virtue of the use of the new GUID, new changes made after restoration will not be confused with any changes made by the server after the backup and before the restoration, which are identified by the old GUID of the server, thereby ensuring convergence of the servers' data through replication.

The replication performance is further optimized by recording. the GUID used by a server and its highest replication sequence number each time a backup of the server is made. The array of used GUIDs and highest backup USNs of a server formed in this way over time provides the history of backup and restoration of the server and is used to avoid replicating changes by the restored server that have already been replicated.

Additional features and advantages of the invention will be made apparent from the following detailed description of illustrative embodiments, which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

Figure 1:
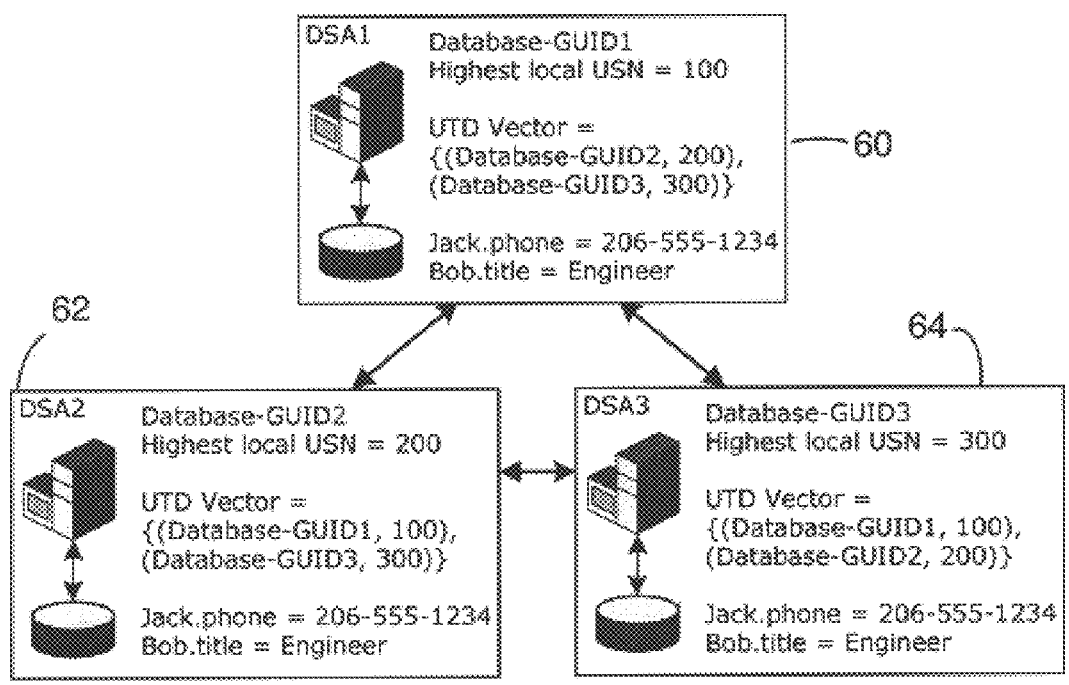
FIG. 1 is a schematic diagram showing the initial states of three directory service agents (DSAs) of a database network.

The present invention is directed to a reliable and efficient way to handle replication among database servers when a server has to be restored from backup. Turning to the drawings, wherein like reference numerals refer to like elements, FIG. 1 shows an exemplary database system with three directory service agents (DSAs) 60, 62, and 64. In this database system, each DSA may make changes to the database system, and the changes are replicated to other servers. To facilitate an understanding of the operation and effectiveness of the present invention, the problems in data replication caused by restoration from backup are first described by way of example.

Referring to FIG. 1, DSA1 60 is at USN 100 using Database-GUID1, DSA2 is at USN 200 using Database-GUID2, and DSA3 is at USN 300 using Database-GUID3. Each DSA has applied all changes originated on the other DSAs. Accordingly, the UTD vector of DSA1 is {(Database-GUID2, 200), (Database-GUID3, 300)}. The UTD vector of DSA2 is {(Database-GUID1, 100), (Database-GUID3, 300)}. The UTD vector of DSA3 is {(Database-GUID1, 100), (Database-GUID2, 200)}. In the illustrated example, all DSAs agree that Jack's phone number is 206-555-1234 and Bob's job title is Engineer.

Figure 2:
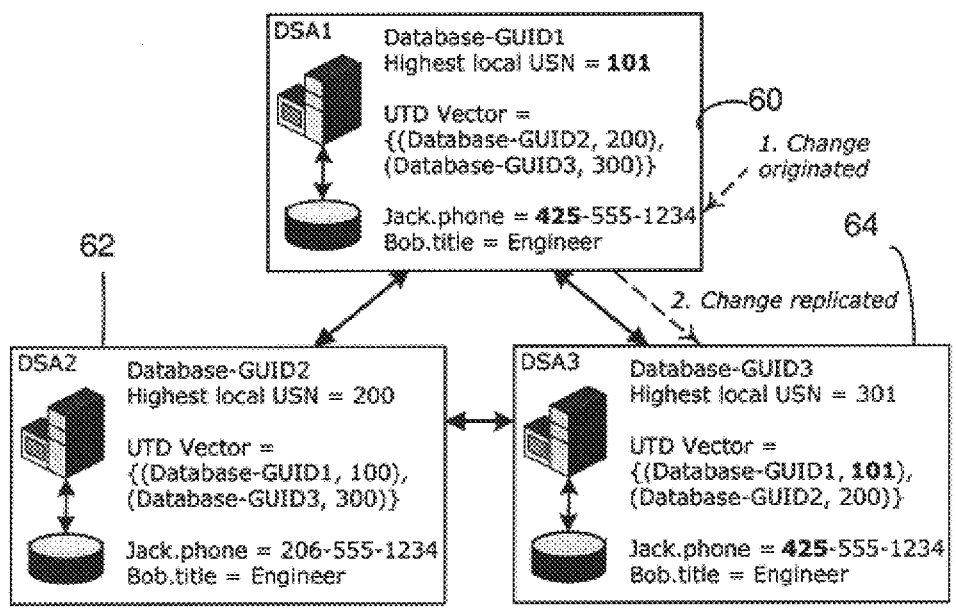
FIG. 2 is a schematic diagram showing the states of the DSAs after a change is made by one DSA and replicated to another DSA.

At this time, a backup is made of the contents of DSA1's local database. The backup records the current state of the DSA1 database, which as noted above defines Jack's phone number as 206-555-1234 and Bob's job title as Engineer. Thereafter, due to a recent area code change, Jack updates his phone number to 425-555-1234 on DSA1, and this change gets the signature (Database-GUID1, 101). This update is replicated to and is applied by DSA3, which updates its UTD vector to {(Database-GUID1, 101), (Database-GUID2, 200)}. The state of the three DSAs at this time is shown in FIG. 2.

Immediately thereafter, a power failure takes down all DSAs. Note that DSA2 has not yet applied the update to Jack's phone number. When power is restored, an administrator discovers that DSA1's database has been damaged by disk write failure and must be restored from backup. In addition, the network card of DSA3 has been damaged and must be replaced. DSA2 is now the only functional replica of the directory service in operation.

Figure 3:
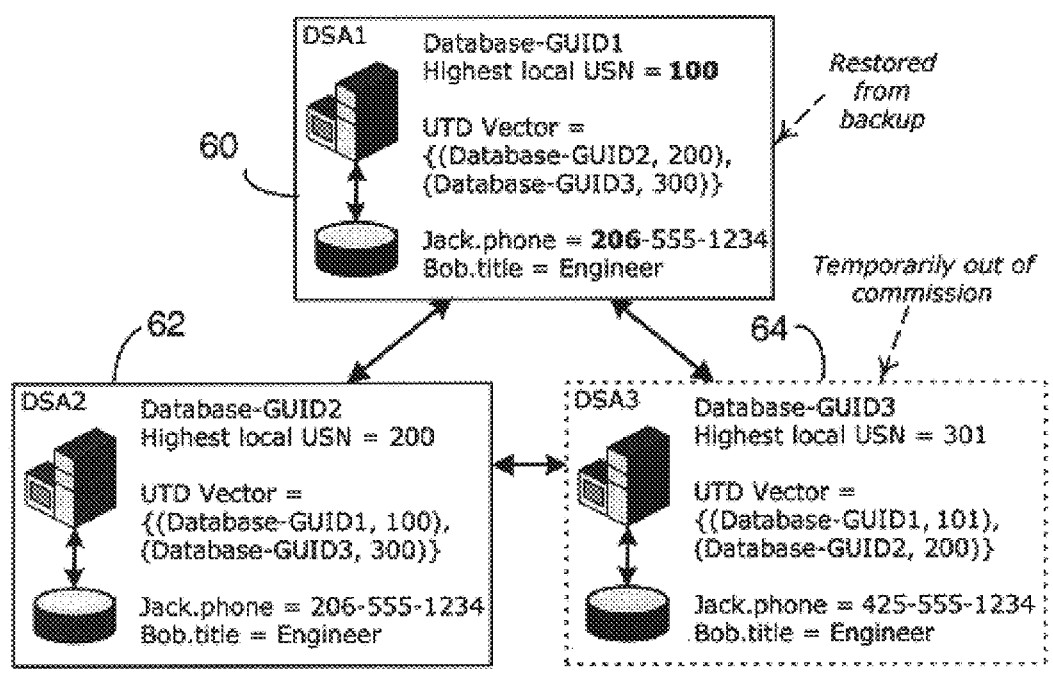
FIG. 3 is a schematic diagram showing the states of the DSAs after one DSA is restored from backup in accordance with a conventional approach.

Subsequently, DSA1 is restored to its exact state at the time of the backup such that it is at USN 100 using Database-GUID1, and records Jack's old phone number (206-555-1234). DSA2 also has Jack's old phone number. This post-restoration state of the DSAs is shown in FIG. 3.

Figure 4:
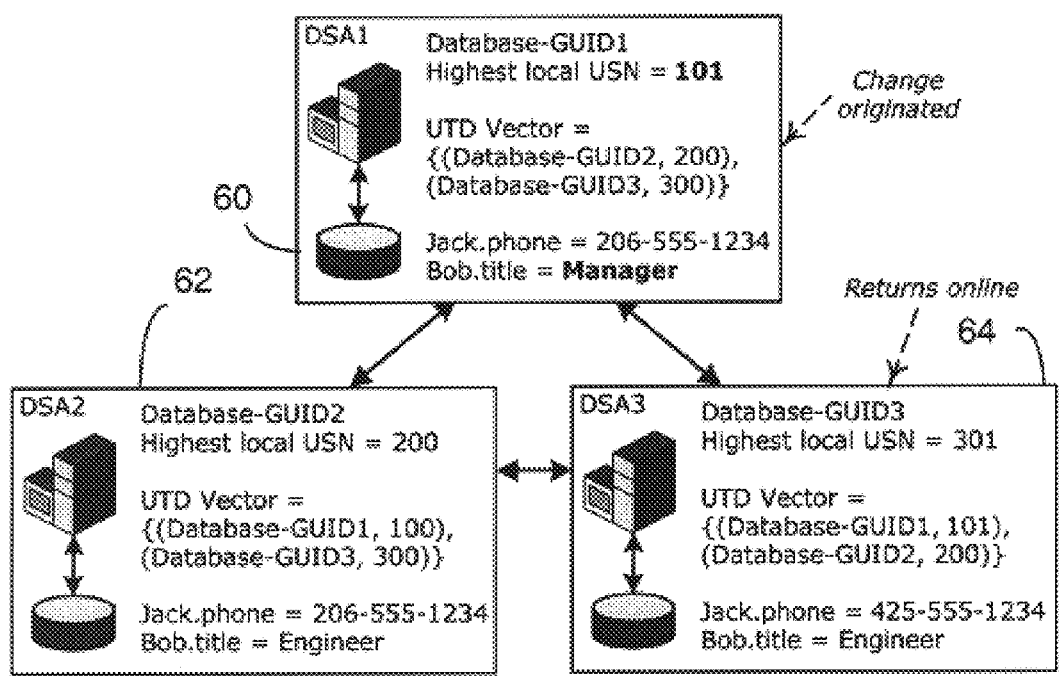
FIG. 4 is a schematic diagram showing the states of the DSAs illustrating a replication inconsistency following the restoration of a DSA caused by the conventional restoration approach of FIG. 3.

The following discussion in connection with FIG. 4 shows what happens when no additional logic is applied to the restored data before DSA1 is brought back online. After DSA1 is restored, the accounting department updates Bob's job title to reflect his recent promotion. Picking any available DSA at random on which to make the change, DSA1 is chosen. Bob's job title is changed to Manager, which gets the signature (Database-GUID1. 101). Note that this signature is identical to the signature given to the phone number update that was made after DSA1 was backed up (but before it was restored). This violates the rule that signatures must be unique, and is the root of the problems illustrated below.

At this time the administrator has finished replacing DSA3's network card,. and DSA3 is returned online. The current. state of each DSA is now unique, as seen in FIG. 4. Specifically, the UTD vector on DSA3 asserts that it has seen the change with signature (Database-GUID1,101). Due to the restoration of DSA1 from backup, there are now multiple changes with this signature—the update to Jack's phone number and the update to Bob's job title. If DSA3 now initiates replication from DSA1, asserting that it has seen all updates through the signature (Database-GUID1, 101), DSA1 will determine that it has no data to send to DSA3. As a result, DSA3's final state is unchanged. The final state of DSA2, on the other hand, is determined by which DSA it replicates from first. If it first replicates from DSA1, it will receive and apply Bob's new job title but never Jack's updated phone number. If it first replicates from DSA2, it will receive and apply Jack's updated phone number but never Bob's new job title.

At this point, all updates and replication have ceased, but discrepancies amongst the DSAs exist—i.e., the replication algorithm has failed to ensure the convergence of data across all DSAs. This is clearly unacceptable.

It has been proposed to solve this inconsistency problem by a "backsyncing" process that is carried out after a DSA is restored from backup and before it goes online to accept new changes. During this time the DSA attempts to replicate in all changes that it itself generated between the time the backup was made and the time the restore was performed. In the example above, the goal would. be to replicate in Jack's new phone number. Upon receiving the change DSA1 would realize that it had already assigned signature (Database-GUID1,101) to an update. It then increases its internal USN so that a subsequent change would get a unique signature (e.g., (Database-GUID1,102)).

Backsyncing is an acceptable solution for the convergence problem as long as DSA1 successfully replicates in all of its post-backup, pre-restore changes from another replica before it returns online to become write-enabled. This is a requirement difficult to meet, however. In the example of FIG. 3, if DSA1 is required to replicate from both DSA2 and DSA3 before coming online for directory service, then it could not come online until DSA3's network card were repaired. If the network card had to be ordered, it might be waiting for a time, such as a week or more. During that waiting period, DSA2, being the sole DSA online, would be a single point of failure. If DSA1 requires that it replicate from either DSA2 or DSA3 before coming online, then it might miss changes. In the example above, this would lead to the same problem as if backsyncing did not take place, as the only DSA that had the phone number update (DSA3) was not online at the time DSA2 was restored. Thus, convergence of the replication algorithm could not be ensured.

In accordance with a feature of the invention, the replication errors after restoration is effectively avoided, and convergence of the states of the DSAs through replication is ensured, by assigning to the restored DSA a new database GUID. This mechanism forces the restored DSA to appear as if it were an entirely new replication partner as far as the replication algorithm is concerned.

Figure 5:
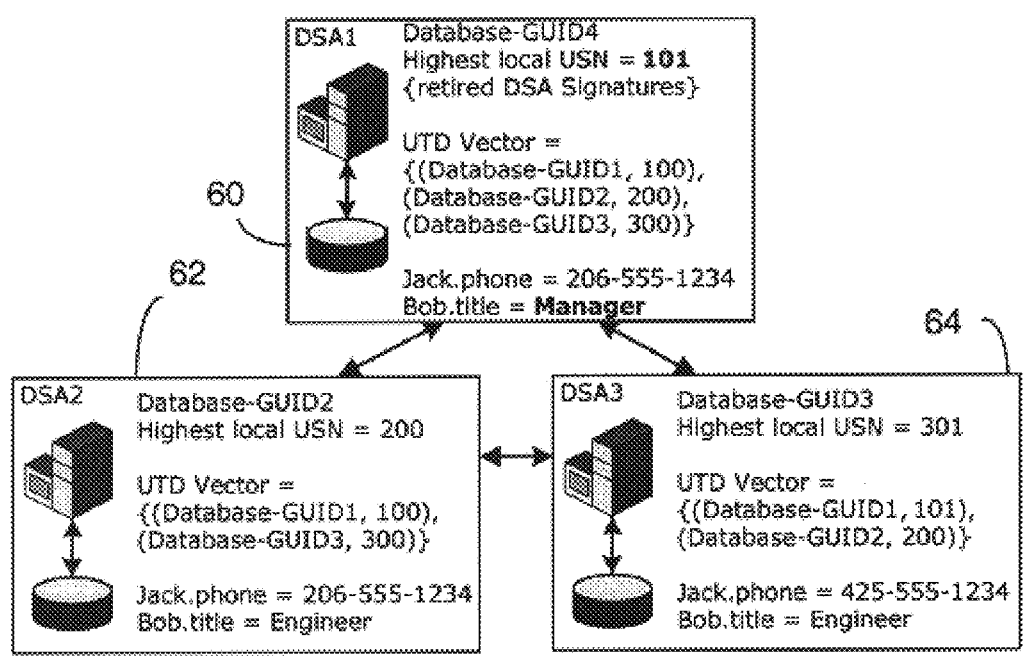
FIG. 5 is a schematic diagram showing the states of the PSAs wherein a new change applied to a restored DSA is identified by a new GUID to avoid replication errors.

In a preferred embodiment, the USN issued to the first change made by the local database subsequent to the restoration is not reset to 0, but is given a value that is greater than, and preferably consecutive to, the highest USN in the backup. Returning to the example described earlier, the states of the DSAs after DSA1 is restored from backup and Bob's job title is updated on DSA1 in accordance with the invention are shown. in FIG. 5. As illustrated, the GUID of DSA1 after the restoration is changed to Database-GUID4, and the new change added is given USN=101.

In one embodiment, the new DSA reports no knowledge of changes made under its previous database GUID when asking for updates from other DSAs. It reports knowledge only of changes made under its current database GUID and those covered by the UTD vector it maintains for the other DSAs. Such information does not contain the database GUID it used at the time of backup. This ensures that any post-backup pre-restoration changes will be replicated to the restored DSA from other DSAs, just as if the changes were made on an entirely different DSA. Also, any new changes generated on the restored DSA get signatures relative to its new database GUID. These two factors combine to eliminate. duplication of signatures, which in turn allows the replication algorithm to again guarantee convergence, regardless of which DSAs are online at the time the restoration from backup is performed and without requiring a backsync period.

This implementation, although effective, does not provide optimized performance concerns in some cases. Because DSA1 states no knowledge of the changes made under its-previous database GUID, its replication partners may send all the data on such old changes to DSA1. This can be a great waste of network resources and bandwidth, as the number of post-back pre-restoration changes under the old database GUID that need to be sent may be very small as compared to the total number of changes under that GUID. In real-world applications, the number of changes made under the old invocation ID can number in the millions. Sending millions of unnecessary updates across the network can introduce performance and scaling problems.

A similar issue exists with respect to replication from the restored DSA to its replication partners. Because the DSAs that were not restored report no watermark with respect to the restored DSA's new database GUID, the restored DSA must potentially look at every object in its database to determine changes that need to be sent. This is because it must look at all objects starting at USN 0 (relative to the new database GUID), not at the highest USN following the last sync (relative to the old database GUID, which now has no bearing on the restored database). If the restored DSA's database is sufficiently large, this can introduce performance and scaling issues similar to the above.

In accordance with a preferred embodiment of the invention, these problems are avoided and the replication performance is optimized by keeping track of the different GUIDs used by each DSA and the extent of each past backup of that DSA. Each time a DSA is restored from a backup, it records the GUID used and the highest USN in the backup. This combination of the last-used GUID and the highest backup USN is referred to as the "retired DSA signature." In this way, the restored DSA knows its highest USN and database GUID at the time of the backup. The collection of retired DSA signatures accrued by a DSA over its lifetime of sequential restores is called its "retired DSA signature vector."

To illustrate this point, an example (which is unrelated to the examples illustrated-in the Figures) of the "retired DSA signature vector" is provided below. Consider a DSA backed up at (Database-GUID1,10); restored, acquiring Database-GUID2; backed up at (Database-GUID2, 35); restored, acquiring Database-GUID3; backed up at (Database-GUID3, 77); and finally restored, acquiring Database-Guid4. Its retired DSA signature vector would look like the following:

| Database guid | USN |
| --- | --- |
| Database-GUID1 | 10 |
| Database-GUID2 | 35 |
| Database-GUID3 | 77 |

In a preferred embodiment, to solve the problem of redundant replication to the restored server as described above, when the DSA is restored from backup, it adds a watermark in its UTD vector containing its old database GUID and the highest USN it assigned prior to being backed up. In doing so, it asserts that all changes it wrote to its own database prior to being backed up are still present in its database, and thereby prevents this data from being replicated back to it from other DSAs.

The solution to the problem of redundant replication from the restored server to the other DSAs is a little more involved, but operates on basically the same principle. When a destination DSA requests changes, it presents its UTD vector to the source DSA, regardless of whether the source DSA was restored from backup. In this embodiment, it is assumed that the mechanism used by the destination server to locate the source server is not based on the GUID of the source server, which may be changed, but on an immutable name of the source server that is independent of its GUID and other parameters, such as its location. When the source DSA has just been restored from backup, its replication partners are oblivious to the restoration. All they know to do is pass their UTD vectors to the source, apply the changes, and update their UTD vectors as instructed by the source. In this case the destination DSA presents a UTD vector that does not include a watermark with the current database GUID of the source—but it does include a watermark with the previous database GUID of the source.

Previously, when the source DSA did not find a watermark in the destination UTD vector that included its current database GUID, it started scanning its database at usnChanged=0 for changes that needed to be sent to the destination. This proves unnecessary, however, when the UTD vector includes a watermark for one of the restored DSA's previous database GUIDs.

By way of example, in the exemplary retired DSA signature vector above, assume the destination DSA presents a UTD vector containing watermark (Database-GUID3, 83). In other words, the destination DSA was in sync with changes made by the source DSA between the time it was backed up and the time it was restored, relative to its previous database GUID. Both. the source DSA and the destination DSA agree on the changes recorded in the source DSA's database up to and including usnChanged 77. It is only usnChanged values greater than 77, which may be different—the destination DSA asserts it has seen usnChanged 77 to 83 relative to Database-GUID3, whereas on the source DSA usnChanged 77 to 83 are relative to its newest database GUID, Database-GUID4.

Since the destination DSA asserts it has seen updates with usnChanged<=77, the source DSA need not revisit these objects looking for changes to send to the destination DSA. It need look only at usnChanged>77, thus avoiding much unnecessary database activity. In actual applications, it would not be uncommon to be looking at usnChanged values of 7.7 million and 8.3 million, rather than 77 and 83. At the conclusion of this replication, the destination DSA updates his UTD vector to show that he is as up-to-date with respect to Database-GUID4 up to the source DSA's most recent USN, so future syncs can start at that point.

Assume, on the other hand, the destination DSA presents a UTD vector containing watermark (Database-GUID3,72). This watermark indicates that the destination DSA is not synced up to all the changes made against the source DSA's previous database GUID prior to its backup. Similar to the above, both DSAs agree on changes made relative to the previous database GUID at usnChanged<=72, so the sync can start at usnChanged 72 just as if the restore were not performed. At the conclusion of this replication, the destination DSA updates his UTD vector to show that he is as up-to-date with respect to Database-GUID4 up to the source DSA's most recent USN (as above), and also up-to-date with respect to Database-GUID3 to USN 77.

Thus, the replication after restoration implemented in a preferred embodiment of the invention includes two parts: (1) changing the database GUID of a restored DSA to guarantee correctness or convergence of the replication among servers, and (2) USN optimization relative to previous database GUIDs for improved performance.

In view of the many possible embodiments to which the principles of this invention may be applied, it should be recognized that the embodiment described herein with respect to the drawing figures is meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

What is claimed is:

1. A method for managing replication of database changes between servers of a database network, each of the servers having a server identification for labeling database changes originated by said each server, the method comprising:
    detecting a restoration of a restored server of the database network from backup, the restored server having an old server identification for labeling database changes originated by the restored database before the restoration;
    assigning a new server identification different than the old server identification to the restored server for labeling database changes originated by the restored server after the restoration; and
    storing the old server identification of the restored server and backup data indicating an extent of backup of database changes labeled with the old server identification.

2. A method as in claim 1, wherein the backup data includes a backup sequence number set to be an update sequence number of a last database change stored for backup under the old server identification.

3. A method as in claim 2, further including:
    receiving from a destination server in the database network a replication request for database changes, the replication request including a replication watermark for database changes labeled with the old server identification;
    determining whether the replication watermark is below the backup sequence number;
    if the replication watermark is below the backup sequence number, sending to the destination server database changes made under the old server identification and between the replication watermark and the backup sequence number.

4. A method as in claim 3, further including sending database changes made by the restored server under the new server identification to the destination server.

5. A method as in claim 4, further including updating, by the destination server, a replication watermark for database changes under the new server identification of the restored server.

6. A method as in claim 1, further including storing, by the restored server, a replication watermark for the old server identification containing the old server identification and the backup sequence number thereof for replication from other servers of the database network.

7. A method as in claim 6, further including presenting, by the restored server, the replication watermark for the old server identification to the other database servers of the database network for replication.

8. A method as in claim 1, further including assigning an update sequence number greater than the backup sequence number to a database change made by the restored server subsequent to the restoration.

9. A method as in claim 8, wherein the update sequence number assigned to the database change made by the restored server subsequent to the restoration is consecutive to the backup sequence number.

10. A computer readable medium having computer executable instructions for a restored server of a database network to perform steps comprising:

detecting a restoration from a backup;

storing an old server identification used by the restored server at time of the backup for labeling database changes and a backup sequence number indicating an extent of backup of database changes by the restored server under the old server identification;

assuming a new server identification for identifying the restored server after the restoration; and labeling database changes originated by the restored server after the restoration with the new server identification.

11. A computer readable medium as in claim 10, having further computer-executable instruction to perform the steps of:

receiving a replication request from a destination server of the database network containing a replication watermark for the old server identification; and sending to the destination server database changes made under the old server identification and having update sequence numbers greater than said replication watermark and up to the backup sequence number.

12. A computer-readable medium as in claim 11, having further computer-executable instructions to perform the step of sending to the destination server database changes under the new server identification made by the restored server after the restoration.

13. A computer-readable medium as in claim 10, wherein the step of labeling includes assigning an update sequence number greater than the backup sequence number to a database change made by the restored server after the restoration.

14. A computer-readable medium as in claim 13, wherein the update sequence number assigned to the database change originated by the restored server subsequent to the restoration is consecutive to the backup sequence number.

15. A computer readable medium as in claim 10, having further computer-executable instructions to perform the step of storing the old server identification and the backup sequence number in a replication watermark for the old server identification.

16. A computer-readable medium having stored thereon a data structure, comprising:

(a) a first data field containing a plurality of retired server identifications previously used by a server in a database network for labeling database changes originated by the database server for replication with other database servers of the database network;

(b) a second data field containing data indicating an extent of restoration from backup of database changes made by the database server under each of the retired server identifications.

17. A computer-readable medium as in claim 16, wherein the retired server identifications are numbers uniquely identifying the server in the database network.

18. A computer-readable medium as in claim 17, wherein the data in the second data field includes a plurality of highest backup update sequence numbers associated with the retired server identifications.

* * * * *

UNITED STATES PATENT AND TRADEMARK OFFICE
CERTIFICATE OF CORRECTION

PATENT NO. : 6,453,326 B1
DATED : September 17, 2002
INVENTOR(S) : Parham et al.

It is certified that error appears in the above-identified patent and that said Letters Patent is hereby corrected as shown below:

Column 6,
Line 6, "nate.duplication" should read -- nate duplication --.
Line 14, "its-previous" should read -- its previous --.
Line 50, "illustrated-in" should read -- illustrated in --.

Column 7,
Line 41, "Both. the" should read -- Both the --.

Signed and Sealed this

Fourteenth Day of October, 2003

JAMES E. ROGAN
*Director of the United States Patent and Trademark Office*